(12) United States Patent
Johnson

(10) Patent No.: US 7,882,087 B2
(45) Date of Patent: Feb. 1, 2011

(54) COMPLEX DEPENDENCIES FOR EFFICIENT DATA WAREHOUSE UPDATES

(75) Inventor: Theodore Johnson, New York, NY (US)

(73) Assignee: AT&T Intellectual Property I, L.P., Reno, NV (US)

( * ) Notice: Subject to any disclaimer, the term of this patent is extended or adjusted under 35 U.S.C. 154(b) by 286 days.

(21) Appl. No.: 12/014,339

(22) Filed: Jan. 15, 2008

(65) Prior Publication Data

US 2009/0182779 A1      Jul. 16, 2009

(51) Int. Cl.
    *G06F 17/30* (2006.01)
(52) U.S. Cl. .................. 707/700; 707/694; 707/667; 707/665
(58) Field of Classification Search ............ 707/1, 707/100, 200, 201–204, 609, 610, 611, 617, 707/623, 624, 638, 661, 665, 667, 694, 700, 707/746
    See application file for complete search history.

(56) References Cited

U.S. PATENT DOCUMENTS

| | | | |
|---|---|---|---|
| 5,765,167 A | 6/1998 | Kiuchi et al. | |
| 5,926,816 A * | 7/1999 | Bauer et al. | 707/999.008 |
| 6,216,125 B1 | 4/2001 | Johnson | |
| 6,581,075 B1 * | 6/2003 | Guturu et al. | 707/999.201 |
| 7,165,100 B2 | 1/2007 | Cranor et al. | |
| 7,249,140 B1 | 7/2007 | Korenevsky et al. | |

* cited by examiner

*Primary Examiner*—Cam-Linh Nguyen
(74) *Attorney, Agent, or Firm*—Hoffman & Baron, LLP

(57) ABSTRACT

The invention relates to a method of updating a data storage system. The method updates a raw database using an input data stream based on an input temporal value associated with the input data stream and a raw temporal value associated with the raw database. The method includes updating a derived database associated with the data storage system using the updated raw database based on the input temporal value, a derived temporal value and a user-defined relationship, the derived temporal value being associated with the derived database. The invention also relates to a computer-readable medium. The computer readable medium including instructions, wherein execution of the instructions by at least one computing device updates a data storage system. The invention further relates to a data storage system. The system includes a raw database, a derived database and a computing device operatively coupled to the raw database and the derived database.

18 Claims, 6 Drawing Sheets

```
DERIVED_TABLE table_name
{
    QUERY { query_text }
    INDICES { index_1; ... index_i }
    NUM_TS_PARTITIONS int;
    TS_ATTRIBUTE
        FIELD ts_attr_name;
        FUNCTION ts_function;
        NOW_FCN now_function;
        LOWER_BOUNDS lb_1; ... lb_j;
        UPPER_BOUNDS ub_1; ... ub_j;
        SOURCE_LOWER_BOUNDS src_1:l_1; ... src_k:l_k;
        SOURCE_UPPER_BOUNDS src_1:u_1; ... src_k:u_k;
}
```

FIG. 4

```
RAW_TABLE
table_name
  {
    FIELDS data_type_1
         field_name_1;
    ...
    data_type_n field_name_n;
    INPUT_PROGRAM
    prog_name;
    FIND_FILES file_finder;
    NUM_TS_PARTITIONS int;
    TS_ATTRIBUTE
         FIELD ts_attr_name;
         FUNCTION ts_function;
         NOW_FCN now_function;
    VISIBLE_TIME max_age;
  }
```

FIG. 5

```
DERIVED_TABLE table_name
{
    QUERY { query_text }
    INDICES { index_1; ... index_i }
    NUM_TS_PARTITIONS int;
    TS_ATTRIBUTE
        FIELD ts_attr_name;
        FUNCTION ts_function;
        NOW_FCN now_function;
        LOWER_BOUNDS lb_1; ... lb_j;
        UPPER_BOUNDS ub_1; ... ub_j;
      SOURCE_LOWER_BOUNDS src_1:l_1; ... src_k:l_k;
        SOURCE_UPPER_BOUNDS src_1:u_1; ... src_k:u_k;
}
``` a) SOURCE_LOWER_BOUNDS R:P;
SOURCE_UPPER_BOUNDS R:P;

b) SOURCE_LOWER_BOUNDS R:P*2;
SOURCE_UPPER_BOUNDS R:P*2+1;

c) SOURCE_LOWER_BOUNDS R:P-3;
SOURCE_UPPER_BOUNDS R:P;

COMPLEX DEPENDENCIES FOR EFFICIENT DATA WAREHOUSE UPDATES

BACKGROUND OF THE INVENTION

1. Field of the Invention

The present invention generally relates to updating data storage systems. Particularly, updating a data warehouse maintaining databases with complex dependencies by means of an input user-defined relationship associating partitions among the databases. Additionally, by means of an input user-defined relationship associating multiple temporal values of a database with the partitions of that database.

2. Brief Description of the Related Art

Communications network administrators, particularly in the field of telephony, are known to process data streams such as network traffic traces, system logs, transaction logs, financial tickers, sensor data feeds, and results of scientific experiments. In the streaming model, raw data files are generated continuously in an append-only fashion, with the processing entity having little control over the length, arrival rate, and arrival order of the input data stream containing new data items. Furthermore, each data item is associated with a timestamp, typically representing its generation time as recorded by the source.

In order to handle real-time processing (such as through queries) over high-speed data feeds, Data Stream Management Systems (DSMSs) restrict the amount of accessible memory. Generally, a telecommunications company executes queries over live network traffic by splitting the stream into contiguous and non-overlapping time windows, each spanning no more than a few minutes. When a window ends, the answer is streamed out, the contents of the window and any temporary state are discarded, and computation over the next window begins a new. For instance, a query may track per-client bandwidth usage over each time window. In addition to non-overlapping windows, other DSMSs allow queries to reference "sliding windows" of recently arrived data. At any time, a sliding window of length w contains data whose timestamps are between the current time and the current time minus w. Still, the sliding window size is bounded by the amount of available main memory as the cost of disk I/O could prevent the system from keeping up with the stream.

Rather than performing light-weight computations on-line and discarding data shortly thereafter, a data stream warehouse or data storage system accumulates historical data for complex off-line analysis. A telecommunications company will typically collect and store terabytes of IP traffic summaries, records or streaming results of queries over the live network and system logs produced by network elements reports or router alerts. The method and system of storing such data in a data storage system is commonly referred to as a "data warehousing". Historical data are used for monitoring, troubleshooting, forecasting, as well as detecting patterns, correlations and changes in network behavior. For example, a network engineer may want to correlate router error messages with changes in the amount or nature of traffic passing through the router immediately before an error was reported.

Querying and updating massive databases is a fundamental challenge of updating and maintaining a data warehouse (also referred to more generally herein as a data storage system). Typically, in addition to storing raw data files, in a raw database, the results of queries (derived data files) are stored in derived databases. These derived databases can have complex dependencies to one or more other databases, which makes them difficult to update.

There is therefore a need for an efficient method and system of generating, updating and maintaining a data storage system. Such a method and system preferably takes advantage of the timestamps or temporal values associated with the input data stream, the stored raw data files and the derived data files. Preferably, such a method and system is capable of updating raw data files as well as complex dependant derived data files without recompiling entire databases, tables or files.

SUMMARY OF THE INVENTION

In accordance with the present invention a method and system of updating a data storage system is described. The method and system include the steps of updating a portion of a raw database using a portion of an input data stream based on an input temporal value associated with the portion of the input data stream and a raw temporal value associated with the portion of the raw database. Additionally, the method and system include the step of updating a portion of a derived database using the updated portion of the raw database based on the input temporal value, a derived temporal value and a user-defined relationship, the derived temporal value being associated with the portion of the derived database.

One aspect of the present invention relates to a method of updating a data storage system. The method includes updating a raw database using an input data stream based on an input temporal value associated with the input data stream and a raw temporal value associated with the raw database. The method also includes, updating a derived database associated with the data storage system using the updated raw database based on the input temporal value, a derived temporal value and a user-defined relationship, the derived temporal value being associated with the derived database.

Another aspect of the present invention relates to a computer-readable medium. The computer readable medium including instructions, wherein execution of the instructions by at least one computing device updates a data storage system. The execution of the instructions updates a raw database using an input data stream based on an input temporal value associated with the input data stream and a raw temporal value associated with the raw database. The execution of the instructions updates a derived database associated with the data storage system using the updated raw database based on the input temporal value, a derived temporal value and a user-defined relationship, the derived temporal value being associated with the derived database.

Yet another aspect of the present invention relates to a data storage system. The system includes a raw database, a derived database and a computing device operatively coupled to the raw database and the derived database. The computing device updating the raw database using an input data stream based on an input temporal value associated with the input data stream and a raw temporal value associated with the raw database. The computing device also updating a derived database using the updated raw database based on the input temporal value, a derived temporal value and a user-defined relationship, the derived temporal value being associated with the derived database.

Additionally, the user-defined relationship can define an association between the raw database and the derived database. Also, the user-defined relationship can define an association between at least one temporal value and at least one database. Further, the user-defined relationship can associate a partition of the raw database with a partition of the derived database. Further still, the user-defined relationship can associate at least one temporal value with a partition of at least one database. Also, the derived database can be partitioned into portions and at least one portion can be dropped from consideration as part of the derived database in conjunction with the updating the derived database.

Other embodiments and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 4 is a view showing a raw database definition in accordance with the present invention.

FIG. 5 is a view showing a derived database definition in accordance with the present invention.

DETAILED DESCRIPTION OF THE PREFERRED EMBODIMENTS

The invention relates to a tool for generating and maintaining data storage systems based on streaming data feeds, such as network traffic traces, financial tickers, and transaction logs. The goal of the data storage system of the present invention is to automate the insertion of new data and maintenance of complex derived databases (materialized views) over time. Efficient database view maintenance can be accomplished by storing data chronologically in an underlying database. The chronology can be based on at least one temporal value associated with the data. In this way, one or more data timestamps are used to order or organize a chronology. Thus, as data accumulates in a database, it is divided or partitioned by such temporal values. The use of the term temporal herein refers to thing pertaining to time. In this way, select portions of a database can be updated when new data is entered. In addition to time partitioning and temporal dimension hierarchies, the data storage system of the present invention preferably provides a user-defined mechanism for specifying temporal relationships between database views and their sources (a user-defined relationship). A database view is a table or select portion of data from one or more raw or derived databases.

Figure 1:
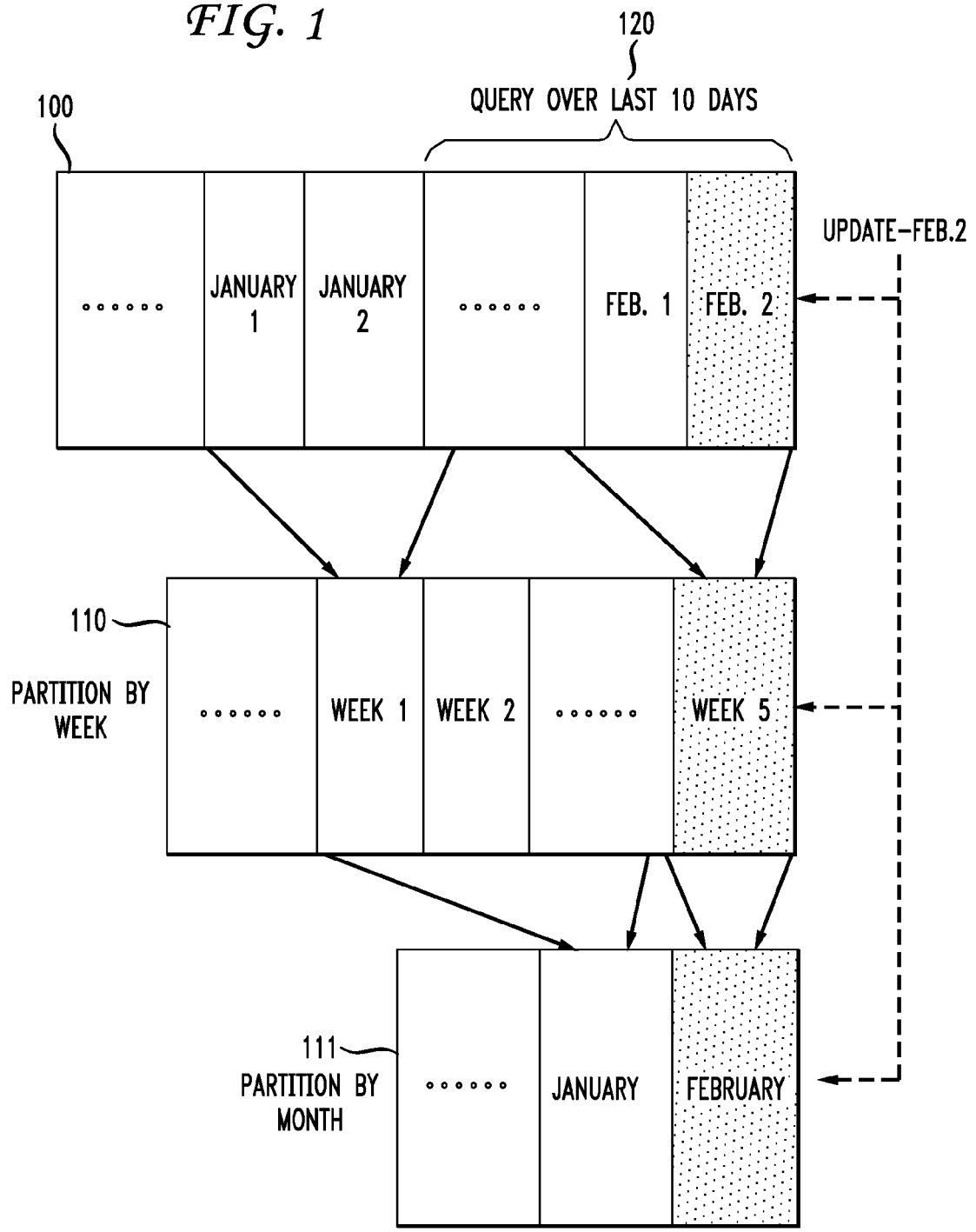
FIG. 1 is a block diagram of a method and system of querying and updating partitioned databases in accordance with the present invention.

One embodiment of the present invention relates to a method and system for generating data warehouses from streaming data feeds, such as those monitored by a large Internet Service Provider (ISP). As shown in FIG. 1, the data storage system of the present invention maintains chronologically partitioned views in an underlying database. The method of the present invention provides a mechanism for defining temporal relationships between the partitions of derived database views and the partitions of the source database from which they are derived. Source or raw databases store the raw data input from a data feed or input data stream.

Users specify which source database partitions are used to generate derived views (derived databases) and which portions of data are temporally correlated. In accordance with the present invention complex dependencies and correlations can be maintained between raw and/or derived databases. Examples include sliding windows (e.g., a derived database defined by or limited to having a select number of the most recent partitions of a raw database) and non-hierarchical relationships (e.g., the start and end times of TCP connections are at most 30 minutes apart). These dependencies are then exploited when queries are processed. For example, if a database view is partitioned on the TCP connection start time, then a query on the end time can be manipulated using known relationships between the start and end time so that the query need not scan the entire view to get a result. Additionally, derived view definitions may be arbitrarily complex and non-monotonic (e.g., select routers that have reported a problem which has not yet been resolved).

The method and system of the present invention preferably provides a powerful tool for the targeted users, among them statisticians and network analysts. However, often the dependencies, such as those described above, may be too complex to be specified as dimension hierarchies. Consequently, the update propagation technique illustrated in FIG. 1 may not apply. Without a general partition dependency mechanism, the underlying database would likely resort to a default method of view refresh, i.e., re-compute the entire view following a change in its source data. This leads to poor performance. The present invention can preferably automate the generation and maintenance of a data stream warehouse, and provide features needed by prospective users so as to leverage existing database technology.

A preferred embodiment of the present invention, partitions data horizontally on the time attribute (a temporal value). Each partition corresponds to a separately indexed database or table. It should be understood that reference herein to a tables or views should be understood to represent the data contained in one or more databases or one or more portions thereof. Thus, rather than modifying a very large table (and its indices) as a whole, only selected partitions are affected during updates depending upon the timestamps of new data. Chronological partitioning can be used to propagate updates of the raw table to appropriate partitions of the data set according to a dimension hierarchy. As illustrated in FIG. 1, if daily sales data are added to raw table 100, then we can determine which portions of the weekly 110 and monthly 111 tables are out-of-date. The selected portion may be updated incrementally or re-computed from scratch, depending upon the cost of modifying versus recreating partitions and indices. FIG. 1 also shows that a query 120 containing a temporal range predicate (last ten days) need not access the entire view, but rather only those portions whose time spans overlap with the predicate.

Figure 2:
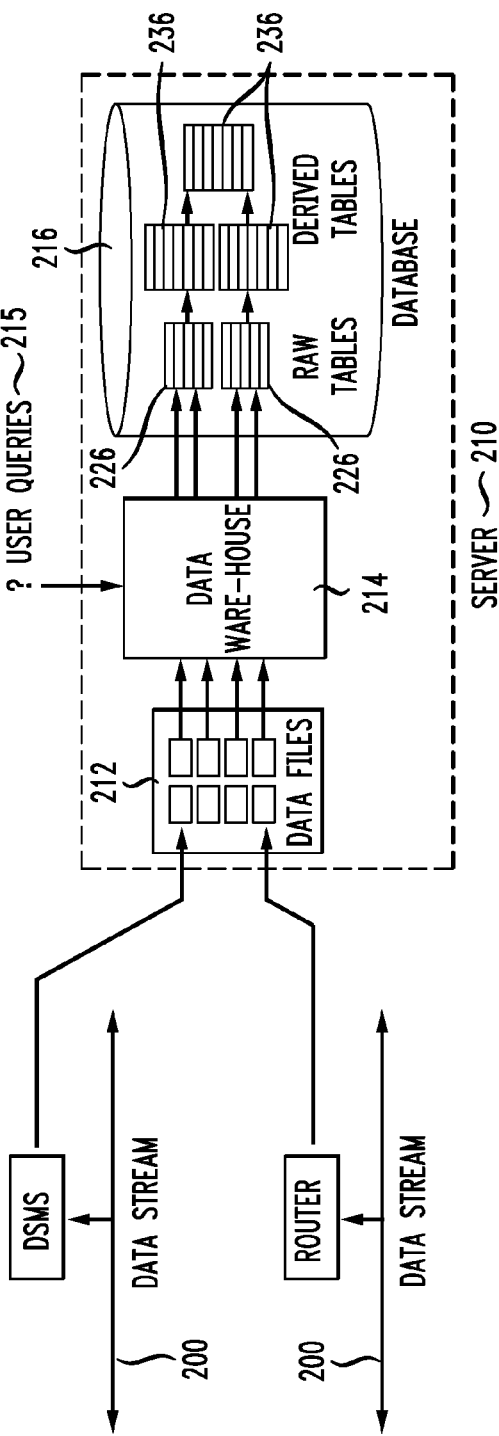
FIG. 2 is a view showing a system overview in accordance with the present invention.

A system overview is shown in FIG. 2. The input data stream 200 generally consists of append-only files that are periodically sent to a server 210. The data storage system of the present invention preferably parses new files according to a user-defined record format (user queries) 215, with recent data records temporarily collected in internal Raw Tables 226. The purpose of raw tables 226 is preferably to provide enough data to update Derived Tables 236 (materialized views) without re-computing them from scratch. While input data files 212 are not deleted automatically, derived tables 236 may be bounded by long sliding windows (on the order of months or years). In addition to extracting data from files and propagating updates throughout the warehouse 214, the data storage system of the present invention preferably intercepts queries 215 in order to determine if they contain temporal predicates which could reduce the number of partitions that need to be scanned. The data storage system of the present invention preferably uses Daytona as the underlying database (see, Sihem Amer-Yahia, Mary F. Fernandez, Rick Greer, Divesh Srivastava, "Logical and physical support for heterogeneous data," at International Conference on Information and Knowledge Management, McLean, Va., USA, 270-281 (Nov. 4, 2002)), which itself stores tables as collections of files. It should be understood, however that the system and method of the present invention are storage-engine-independent.

Figure 3:
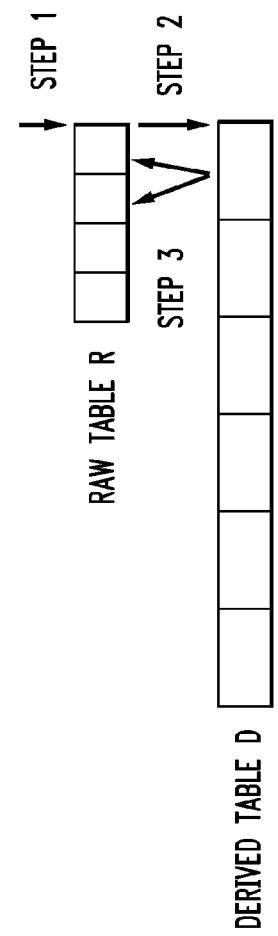
FIG. 3 is a block diagram of a method and system of file maintenance in accordance with the present invention.

FIG. 3 shows a Derived table D, which defines a materialized view over a data feed corresponding to a raw table R. First, a data feed or New file is parsed and its records are added to the appropriate partitions of the Raw table R according to the values of their timestamps. The new records may be scattered across more than one partition of the Raw table R, for example because some files arrive late, while some sources may have fast clocks and produce data having "future" timestamps. In the second step, a determination is made as to which partitions of Derived table D are out-of-date. This is done by examining user-specified partition dependencies (user-defined relationships) between Derived table D and Raw table R. In FIG. 3, only the youngest (rightmost) partition of D is affected. The third step updates out-of-date partitions of D. In the simplest case, this is done by incrementally revising the affected partitions (e.g., by adding the sum of new sales data to the current totals, as in FIG. 1). However, in general, the data storage system of the present invention may need to re-compute out-of-date partitions of D, though it need not re-compute all of D, which could be very large. To do this, the user-defined relationships are examined again to find the partitions of R from which an out-of-date partition of D is derived. Thus, a raw table is effectively a sliding window over a recent portion of a data feed, which must contain enough data to update stale partitions of derived tables.

In order to generate a data stream warehouse using the data storage system of the present invention, a user writes a configuration file containing the definitions of raw and derived tables (a user-defined relationship). A raw table definition provides enough information to find the appropriate input data files, interpret them, and determine the destination of each portion of the record. Raw tables may be materialized explicitly or simply store pointers to recently arrived files. The syntax of a raw table definition is shown in FIG. 4.

The FIELDS construct lists the data types (BOOL, INT, FLOAT, STRING, DATE, etc.) and column names of the raw table. INPUT_PROGRAM is the command for interpreting each file in the data feed, e.g., unzip and pipe to a Perl script for parsing. Users may reference custom scripts for parsing arbitrary file formats. Additionally, the data storage system of the present invention generates a verifier to ensure that incorrectly formatted records are rejected. FIND_FILES specifies a command for finding source files comprising the data feed. A user-defined command, such as file_finder or a data storage system provided "findfiles" program which accepts a regular expression, e.g., NUM_TS_PARTITIONS determines the number of partitions of the raw table.

TS_ATTRIBUTE defines a new column, named ts_attr_name, corresponding to the timestamp field by which the raw table is partitioned. FUNCTION specifies the time span of each partition. For example, suppose that the raw table is partitioned by unix_time. If each partition holds one hour of data, then the user writes FUNCTION hour_of (unix_time), where hour_of ( ) is a built-in function. Related functions such as day_of ( ) and minute_of ( ) are also provided.

Given that NUM_TS_PARTITIONS is fixed, a raw table is a sliding window of recently arrived data on a given stream; new partitions are created and old partitions discarded as time goes on. The window size of a raw table is equal to the time range of each unique timestamp (temporal) value, as defined in FUNCTION, multiplied by NUM_TS_PARTITIONS. In general, a raw table should be sufficiently large as to cover delayed and "future" data. For example, if a new data feed file arrives daily, and then two partitions of length one day each are appropriate if some records have timestamps up to one day behind the timestamp of their file. However, a raw table as shown in FIG. 3 may also be used to re-compute out-of-date partitions of derived tables. Therefore, the data storage system of the present invention may dynamically adjust the number of partitions of a raw table depending upon the set of derived tables sourced from it.

NOW_FCN specifies the maximum allowable timestamp value. Since raw tables are windowed, now_function prevents a spurious data record from moving the maximum timestamp too far ahead and wiping out valid data. Now_function may be of the form now( )+s, where now( ) is a built-in function that returns the current time and s is a slack value that bounds the clock drift of the data sources. When a new file is processed, records with temporal values greater than the now_function are ignored (more specifically, they are retained in the data file but not inserted into the raw table).

Since a raw table is preferably partitioned into ranges of the temporal field, it is effectively a partially sorted view of a recent portion of the data feed. However, in some cases, the data storage system of the present invention may be able to determine the destination partition for each record in a new data file by examining the file name (i.e., without parsing individual records and accessing their timestamps). For example, it may be known ahead of time that a source generates a new file once a day, which contains records having temporal values (timestamps) equal to the current day; the file name may be of the form MM-DD-YYYY.dat. If so, then the user may specify ts_function as a regular expression referencing the path and/or name of the data file. In this case, i.e., if ts_function does not reference any fields inside the file, the raw table is not materialized. Instead, it only stores metadata consisting of a list of files belonging to each partition. This type of a raw table is said to be direct; a materialized raw table is said to be indirect. Of course, the definition script of a direct raw table must still be written as it contains the location of data files, parsing instructions, and sliding window length. Both direct and indirect raw tables can be queried in the same manner as any other table. In fact, derived tables may be defined as the results of queries over one or more raw tables.

Finally, VISIBLE_TIME is the oldest file (as measured by its timestamp) eligible to be part of the raw table. This may seem redundant since the oldest eligible file could be identified by subtracting the sliding window size of the raw table from the current time. However, clock drift may cause some sources to report data from slightly in the future. Therefore, a file with a timestamp just outside the current window range may contain some records whose timestamps are within the window range. The value of VISIBLE_TIME should therefore be set to the sliding window length of the raw table plus the slack parameter s. In general, other metadata in the file name can also be extracted using regular expressions and referenced as fields of a raw table.

Indirect raw tables are materialized so that out-of-order records are placed in the appropriate partitions. This, in turn, enables the data storage system of the present invention to find all the partitions of a raw table needed to update a partition of a derived table (see FIG. 3).

A derived table is a materialized view over one or more source tables, which could be direct raw, indirect raw, or derived. Derived tables may be indexed and queried on-demand. Raw tables can also be queried, but they are not indexed. Moreover, since direct raw tables are not materialized, the data unpacking required to access records inside the underlying data feed files can be slow. As shown in FIG. 5, a derived table definition provides the data storage system of the present invention with enough information to detect which partitions are stale and how to update them.

QUERY defines the contents of the derived table. The ISP implementation of the data storage system of the present invention can employ SQL with extended support for correlated group-by expressions. Alternatively, query_text may contain a call to a Perl or C program which, for example, computes a user-defined aggregate function. The set of indices is specified by INDICES over the derived table. As in raw tables, NUM_TS_PARTITIONS specifies the number of partitions and TS_ATTRIBUTE defines the timestamp attribute used for partitioning. Additionally, the LOWER_BOUNDS and UPPER_BOUNDS parameters inside the TS_ATTRIBUTE block specify temporal correlations between the partitioning attribute and other attributes of the derived table. Each pair of lb_i and ub_i parameters denotes the lower and upper bounds, respectively, of the range of values of the partitioning attribute expressed using another attribute. For instance, suppose that a derived table storing TCP connection statistics is partitioned by the hour of connection end time. The following excerpt of the table definition asserts that the end time of a TCP connection is at least as large as its start time, but no more than one hour larger.

```
DERIVED TABLE TCP_connections
    ...
    TS_ATTRIBUTE
    FIELD hour_end_time;
    FUNCTION hour_of (end_time);
    NOW_FCN now ( );
    LOWER_BOUNDS hour_of (start_time);
    UPPER_BOUNDS hour_of (start_time)+1;
    ...
```

The significance of correlating the partitioning attribute with other attributes is that the former acts as a coarse-grained index. In particular, such a correlation through a flexible declarative (user-defined) mechanism can associate multiple time stamp attributes with a partition of a table. Recall from FIG. 1 that a raw table partitioned by day need not be scanned in its entirety by a query referencing only the last ten days of data. In the above example, queries over the TCP_connections table with predicates on the end time can be answered nearly as efficiently as queries with predicates on the start time. This efficiency is possible because the data storage system of the present invention rewrites the predicate on start time to reference end time (which is the partitioning attribute) using the lower and upper bounds. Without this rewriting, a query extracting records having start times within a particular range would need to scan all of TCP_connections, which could be very large.

The last two lines of a derived table definition relate the partitions of a derived table to those of its k source tables. These relationships form a preferred aspect of the data storage system of the present invention's view maintenance mechanism. The name of the ith source table is referred to as src_i and l_i and u_i, respectively, specify the lower and upper bounds on the partitions of the ith source table from which a single derived table partition is computed. Suppose that derived table D refers to a single raw table R having 8 partitions of length one day each.

Figure 6A:
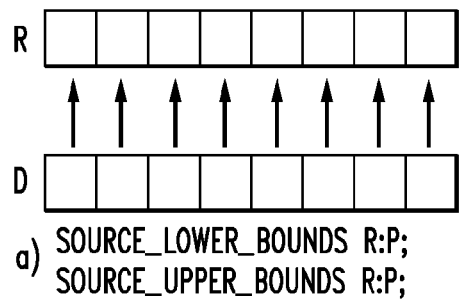
FIGS. 6a-6c are block diagrams showing partition dependencies in accordance with the present invention.
Figure 6B:
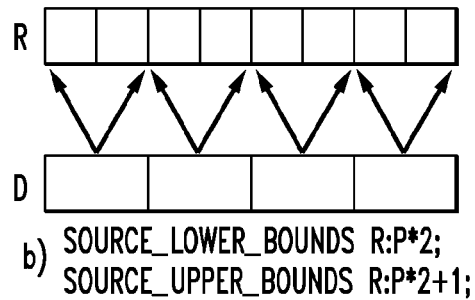
Figure 6C:
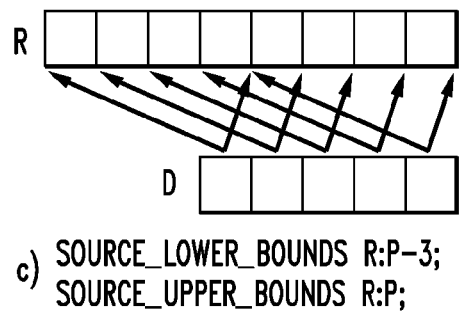

FIG. 6a illustrates the simplest case, in which D also consists of 8 partitions of one day each. This example is for illustrative purposes only; D can have many more partitions than R. The upper and lower bounds are the same; in other words, the P th partition of D is derived from the P th partition of R. In FIG. 6b, D stores two days of data per partition, making the lower and upper bounds $P*2$ and $P*2+1$, respectively. That is, two consecutive source partitions of one day each are needed to compute one derived partition; the multiplication factor signifies a change of scale from one-day to two-day partitions. This example is similar to a traditional dimension hierarchy such as the one shown in FIG. 1. In FIG. 6c, D is a sliding window aggregate extending four days into the past, as specified by the lower and upper bounds of $P-3$ and P, respectively. In this example, D contains five single-day partitions, meaning that aggregated values computed in the last five days (each computed over a four-day window) are retained. Note that a single partition suffices if the user is interested in tracking only the latest value of the sliding window aggregate as time goes on. This is analogous to the DSMS notion of a continuous query.

Derived tables built from more than one source table can be defined in a similar way. For instance, if D references two raw tables partitioned by day, call them R1 and R2, and each partition of D references one day of data from R1 and two days of data from R2, then the bounds are:

```
SOURCE_LOWER_BOUNDS R1:P1; R2:P2*2;
SOURCE_UPPER_BOUNDS R1:P1; R2:P2*2+1;
```

In general, the ts_function, NUM_TS_PARTITIONS, and sliding window size of D need not be the same as those of R. There are in fact up to five independent parameters governing the interaction between R and D: their respective partition lengths and numbers of partitions, and, optionally, the sliding window size over which each partition of a derived table is computed (see FIG. 6c). This functionality is crucial in a data warehouse, where derived tables over massive data feeds often involve aggregation, which greatly reduces the data volume and allows aggregated data to be kept for a long period of time. For instance, R may contain an hour of raw Netflow records, whereas D may store as much as a year of per-hour aggregation of router-to-router traffic partitioned by day. Moreover, as in FIG. 6c, it is often desirable to compare aggregates or models computed over successive (overlapping) sliding windows in order to detect changes in the underlying distribution of the data feed. Finally, note that a derived table definition does not include a VISIBLE_TIME parameter because out-of-order timestamps are dealt with at the level of raw tables.

As described above, the data storage system of the present invention allows users to specify complex derived tables, correlations among attributes, and dependencies on the partitions of source tables. Additionally, derived tables are initialized and updated over time using partition dependencies. FIG. 3 shows that it is preferable to update a derived table having an arbitrarily complex defining query without re-computing it in its entirety; only those partitions which are out-of-date should be updated or rebuilt if necessary.

Figure 7:
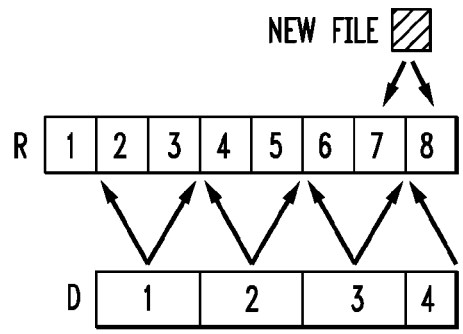
FIG. 7 is a block diagraph showing a relationship between a raw and derived database in accordance with the present invention.

FIG. 7 illustrates a default update strategy for R and D as defined in FIG. 6b. Suppose that R is indirect (i.e., materialized due to of out-of-order timestamps). For clarity, partitions have been numbered in chronological order. Note that R typically stores only a few partitions to collect out-of-order data, so if its NUM_PARTITIONS is three, then only partitions 6, 7 and 8 are still materialized. Also note that at the current time, the youngest partition of D is assumed to be only half-full.

Preferably, the data storage system of the present invention stores metadata associated with each raw and derived table. The metadata contains a list of partitions along with their temporal values (timestamp ranges and last-modified-times). For each partition, the data storage system of the present invention also stores pointers to the corresponding table and any indices over the table (in case of a direct raw table, the pointers refer to the actual source files).

In order to update R, The data storage system of the present invention accesses the location specified in FIND_FILES (see FIG. 4) and searches for files which have been uploaded since the last-modified-time of R. We assume that new data arrive in separate files, so previously uploaded files are not updated. Suppose that one new file has arrived, as shown in FIG. 7. Records are extracted from the file and inserted into the appropriate partitions of R. Recall that records with timestamps greater than now_function are ignored. Also, note that new partitions of R may be initialized and old partitions dropped, depending upon the timestamp values of the new records. For instance, if the youngest partition of R contains records with timestamps in the 8 o'clock to 9 o'clock range, then a new record with a timestamp of 9:01 triggers the creation of a new one-hour-long partition and truncation of the oldest partition. Finally, the last-modified-time of each affected partition is set to the current time. If R is direct, then the data storage system of the present invention detects which partition of R the new file belongs to, creates a pointer from the appropriate partition to the new file, and changes the last-modified-time of the affected partition.

Suppose that the new file contains some records belonging to partition 7 and some to partition 8 of R, as illustrated in FIG. 7. The next step is to update the derived tables depending upon R. For each updated partition of R, The data storage system of the present invention inverts the SOURCE_LOWER_BOUNDS and SOURCE_UPPER_BOUNDS (see FIG. 5) to determine which partitions of D need to be updated. This means that the allowed formulae used to specify the bounds are those which the data storage system of the present invention can invert; for example, simple arithmetic operations are easily invertible. For this example, the inverted bounds are both P/2. Note that some of the affected D-partitions may not yet exist. For example, when the 8th partition of R is created, the 4th partition of D must be initialized. In this case, the data storage system of the present invention creates the new partition(s) and drops old partitions to keep NUM_TS_PARTITIONS fixed. In FIG. 7, updates of partitions 7 and 8 of R trigger updates of partitions 3 and 4 of D, as determined by the inverted bounds.

Now, for each out-of-date partition of D (as determined by comparing its last-modified-time against the last-modified times of its source partitions), the data storage system of the present invention performs the following tasks. First, the partition is effectively cleared. Next, it is re-computed by running the query_text from the QUERY specification, but only over those R-partitions which are linked to the derived partition via SOURCE_LOWER_BOUNDS and SOURCE_UPPER_BOUNDS. Furthermore, the query that reconstructs the D-partition includes an additional timestamp predicate to ensure that only those records which fall within the timestamp range spanned by this D-partition are inserted. For instance, this is necessary if D has smaller partitions than R or if the time granularities of D and R do not align (e.g., weeks versus months). Finally, the metadata associated with the modified partitions of D are updated to reflect the new last-update times. In FIG. 7, partition 3 of D, as well as any indices defined over it, are re-created from partitions 6 and 7 of R, whereas partition 4 of D is re-created from partition 8 of R. Thus, the changes made to partitions 7 and 8 of R are now reflected in D via re-computation of selected partitions. If there is a derived table D' computed from D, then the process of updating D' is analogous to that of computing D from R.

We point out the following observations regarding the data storage system of the present invention's partition dependency framework. First, the method for maintaining derived tables includes defining each partition of a derived table to have dependencies on partitions of its source tables and is updated whenever one or more of its source partitions are updated. As a result, the dependency chains must be acyclic but may be arbitrarily long, i.e., arbitrary levels of derived tables may be maintained. Moreover, arbitrarily complex derived tables may be maintained because, in the worst case, whole partitions are re-computed by running their defining queries over relevant parts of the source data.

It is worth noting that without temporal partitioning and the relationships encoded in SOURCE_LOWER_BOUNDS and SOURCE_UPPER_BOUNDS, an update of a raw table could potentially cause the entire derived table to be re-computed. For example, suppose that a raw table R and derived table D are partitioned by a field other than the timestamp (e.g., they may store router logs and may be partitioned by router IP address). Even if partitions of R and D are related (e.g., both are partitioned by router IP address, so it is clear which raw partitions generate a given derived partition), a newly arrived file may contain data for many different routers. Therefore, every partition of R could incur insertions and correspondingly, all of D's partitions would have to be updated.

Further, the typical sizes of tables maintained by the data storage system of the present invention may be arbitrarily long, subject to disk space constraints. On the other hand raw tables preferably contain recently arrived data. For instance, if the user knows that data records are at most two days late, then the raw table stores only the last two days of data so that incoming records are partitioned correctly. However, the user-specified raw table size may not be sufficient to allow re-computation of out-of-date partitions of derived tables. Referring to FIG. 7, suppose that the user configures R to have two partitions, i.e., at the current time, partitions 7 and 8 are materialized. This means that the third partition of D cannot be re-computed as it requires access to partition 6 of R. Another example of this problem is illustrated in FIG. 6c, where R must be at least as long as the sliding window length over which each partition of D is computed. For these reasons, the data storage system of the present invention can automatically adjust the sizes of raw tables by analyzing the inverted SOURCE_LOWER_BOUNDS and SOURCE_UPPER_BOUNDS of the corresponding derived tables. This process can be performed regularly as new derived tables are added and existing tables dropped. In a preferred embodiment, this process is performed on an "as needed" basis and/or initiated by network administrators manually. In an alternative embodiment this process is performed automatically.

A related issue concerns the sizes of individual partitions. In general, smaller partitions lead to faster updates. For instance, in FIG. 7, in which R is partitioned by day; if the size of each partition of R is increased to one week, then recreating partitions of D could take more time. To see this, observe that only some of the data from a large R-partition would be used to recompute a D-partition, yet the entire R-partition would have to be scanned anyway. Similarly, if R is partitioned by day but D is partitioned by week, then it would take longer to recompute an individual D-partition. On the other hand, small partitions may degrade query performance if many queries contain timestamp predicates spanning multiple partitions. In this case, the answer must be generated by accessing multiple tables and merging multiple partial answers. In some situations, the query workload and/or frequency with which data feed files are produced suggest appropriate partitions sizes. For instance, queries may access data from individual days, therefore partitioning the table by day ensures that only one partition or index is scanned.

The data storage system of the present invention's warehouse maintenance procedure is compatible with arbitrary derived table definitions because, in the worst case, out-of-date partitions are recomputed from scratch by calling the defining query. We now define three sets of queries that produce derived tables whose partitions may be maintained incrementally by appending new data. It should be understood that other query types are known for which derived table maintenance can be simplified.

The first optimization applies to derived tables constructed from a single source table using simple selection and projection. For example, suppose that a raw table R accumulates control messages from routers. A user may be interested in tracking critical messages, in which case the query_text of the corresponding derived table D would be similar to:

SELECT*FROM R WHERE priority=critical

In this case, it is not necessary to materialize R even if out-of-order timestamps are expected. This is because new records having critical priority can simply be extracted from the data feed and appended to the appropriate partition of D. Note that out-of-date D-partitions need not be recreated because appending new records with critical priority does not change the existing records in D.

A similar optimization applies if D computes distributive aggregates over R, such as max, min, sum, and count. See, J. Gray et al., "Data cube: A relational aggregation operator generalizing group-by, cross-tab, and sub-total," In Proc. ICDE Conf., pp. 152-159, (1996), incorporated herein by reference. Suppose that D stores hourly counts of control messages per router. Its query_text would be similar to:

SELECT hour_of(timestamp) as t, ip_address, count(*) FROM R GROUP BY t, ip_address When a new file arrives, preferably the number of new control messages for each router and for each one-hour interval is counted, and update the affected partitions of D by adding the counts of new records to the existing counts. It is preferably not necessary to re-count the total number of control messages sent by each router for each updated D-partition.

Figure 8:
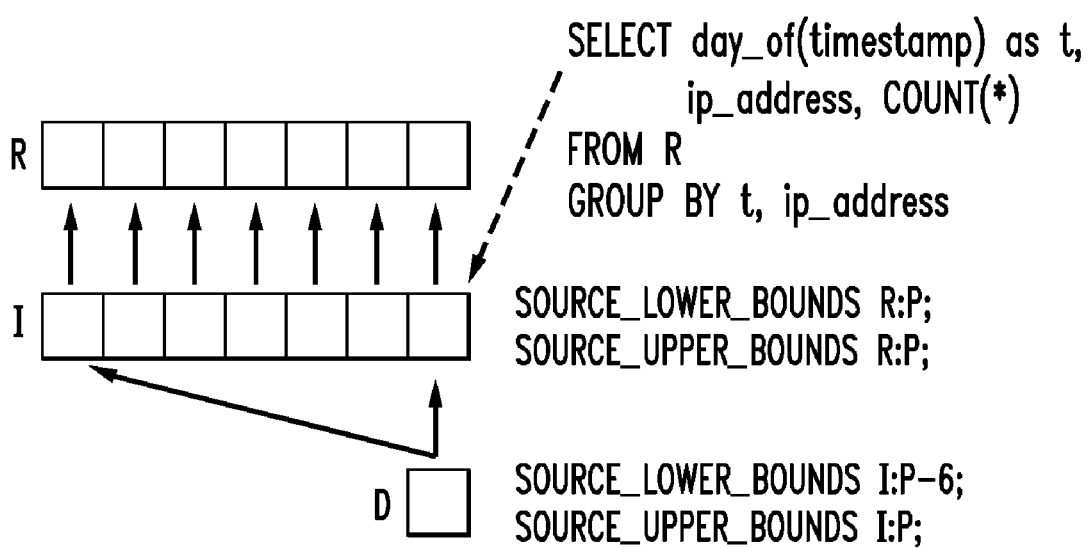
FIG. 8 is a block diagram showing an optimized computation of distributive aggregates over sliding windows in accordance with the present invention

The third optimization concerns distributive aggregates over sliding windows and is based upon DSMS techniques. Suppose that D tracks the number of control messages per router over a sliding window spanning one week, with an updated answer generated every day. If R is partitioned by day, then D may be constructed as in FIG. 6c, except that the SOURCE_LOWER_BOUNDS is P-6 and the number of partitions of D is one. Now suppose that a new file arrives with data for the current day. This causes the latest partition of D to be created by re-computing the answer over the entire week. In contrast, the optimized technique stores an intermediate derived table, call it I, containing the counts of control messages for each router per day, similar to FIG. 6a. D is then rewritten to reference I rather than R, as illustrated in FIG. 8. Thus, D is computed by summing up seven lists of pre-aggregated per-router counts instead of counting each individual control message over the last week.

Note that the intermediate derived table I may be re-used to create other derived tables defined by the same query as that of D, but having different window sizes (of up to 7 days). To do this, SOURCE_LOWER_BOUNDS of the other derived table is preferably set to P-(w-1), where w is the desired window length.

Users of the data storage system of the present invention may specify whether the warehouse should be updated periodically or on-demand; additionally, different sets of tables may be configured to be updated with different frequencies. Each update of an individual table is considered to be an automatic operation. It is accomplished by creating empty shadow copies of out-of-date partitions (effectively clearing them), updating the shadow copies and their indices, and revising the metadata of the table with pointers to the changed partitions and indices. This procedure allows simple multi-versioning by way of short-lived locks. When a query accesses a derived table D, it locks D's metadata via a shared lock, copies the locations of the necessary partitions of D, and releases the lock immediately. An update may be installed as the query is scanning old copies of D's partitions. To do this, The data storage system of the present invention locks the metadata via an exclusive lock, updates pointers of partitions that have changed, and releases the lock immediately after the update.

This concurrency control mechanism is preferred because there is a single updater, though potentially many readers, and because of the partition-wise update policy. In the case of the selection query optimization (which appends data to the end of a partition rather than re-computing it), a modified concurrency control technique is used (the details of which are database-specific). Furthermore, there is no need for any recovery mechanism because tables (or individual partitions thereof) may always be re-computed from the data feed files.

Additionally, it should be noted that if a user configures the data storage system of the present invention to always update a set of tables (or the entire data warehouse) at the same time, then a dependency graph is built and the order in which updates are performed is determined by a topological sort of the graph. That is, a table is updated after all of its source tables have been updated. Users may also choose to update a set of tables in one automatic operation. In this case, the data storage system of the present invention creates shadow copies of out-of-date partitions of the entire set of tables, performs the necessary updates, (exclusively) locks the metadata of each updated table simultaneously, and releases all locks when all the updates have been applied. This procedure may reduce query throughput, but ensures that all tables within the same set are synchronized with respect to each other.

The process of loading a new derived table D is now addressed. Suppose that D is sourced from a raw table R. Usually, R does not contain sufficient data to build D; for instance, R could be defined to store the last two days of data, whereas the size of D could be one year. In this case, the data storage system of the present invention accesses historical data from the source files corresponding to the given data feed (recall that old files are not deleted automatically in case a user needs to access them in the future). If R is direct, then the data storage system of the present invention determines the set of relevant files whose timestamps fall within the sliding window range of D. Preferably, the derived table is then built; one partition at a time, by extracting records from the relevant data feed files as determined by the SOURCE_UPPER_BOUNDS and SOURCE_LOWER_BOUNDS. If R is indirect, then the data storage system of the present invention preferably adds the value of VISIBLE_TIME of R to the desired sliding window length of D and temporarily materializes records in those source files whose temporal values are within the resulting time bound. After all the relevant records have been placed in the appropriate partitions, the SOURCE_UPPER_BOUNDS and SOURCE_LOWER_BOUNDS can be used to build each partition of D. This procedure avoids reading all the data feed files (which could span much more time than is needed to build D), yet ensures that out-of-order records are still included in D.

The data storage system of the present invention preferably collects all or at least a great deal of network configuration and performance data into a collective data storage system. The data storage system must accommodate a large number of large and diverse tables, and must support a large number of regularly generated complex reports as well as ad-hoc queries. Furthermore, this warehouse needs to be "DBA-free", as it is maintained primarily by the network measurement research staff.

Preferably, such a data storage system maintains dozens of derived tables and Terabytes of data, and is used for a large number of reporting services on a daily basis. This collection of tables is preferably only a small portion of the data which are slated to pass through the communications network, the gating factors being available storage and networking researcher expertise in defining the tables.

An example of an input data stream collected by the system consists of reports of router CPU utilizations throughout a network. The input data files are stored in the raw table CPU_RAW. A selection query over this raw table gives rise to a derived table CPU. The CPU table is one component of a network health monitor, used both to diagnose problems (e.g., hung router) and predict potential problem spots (e.g., traffic congestion). One problem with the CPU table is that it depends upon router reports being reliably delivered to the data warehouse, but these reports are often lost. To avoid misdiagnosis of network alerts, the missing CPU data must be flagged. For this purpose, the CPU_MD table is derived from the CPU derived table and consists of the missing CPU events. This is one example of the need for multiple levels of derived tables. Note that CPU_MD is defined by a complex negation query, as it reports excessively long gaps between successive reports from a router.

Another example of an input data stream stored in the system is called COMPASS and contains network performance reports from a large number of sources. Two raw tables are defined over this data feed: COMPASS_RT_RAW and COMPASS_H_RAW. The former is indirect (materialized) and stores ten partitions of size five minutes each. This may be defined in response to an observation that a small group of records may have timestamps up to 50 minutes behind the timestamp of their file. COMPASS_RT_RAW is used to maintain the COMPASS_RT derived table. This derived table is also partitioned into five-minute intervals. COMPASS_RT acts as a near-real-time table in the sense that it is updated very often. In particular, every five minutes, approximately 80,000 new records are inserted. For about half of the updates, only the youngest partition of COMPASS_RT is affected (there are no out-of-order records). For the other half, two partitions are affected (there is a group of records up to 50 minutes late, which map to an older partition of COMPASS_RT_RAW and therefore are added to an older partition of COMPASS_RT). Preferably, the updates always complete within 90 seconds, even on relatively old hardware (a heavily loaded SPARC III with five processors of 900 MHz each). Moreover, the multi-version concurrency control, COMPASS_RT is preferably always available for querying.

The COMPASS_RT table contains a two-day window of recent data; for historical queries, a 180-day window of COMPASS data is stored in the COMPASS_H table. This is preferably a derived table computed from COMPASS_H_RAW, which is a direct raw table. COMPASS_H can contain 410 Gigabytes of data and indices, and approximately 4 billion records. It is preferably partitioned by hour (of the record timestamp) in order to avoid the excessive number of files that five-minute partitions would cause. COMPASS_H is preferably scheduled for updates once a day.

One reason why COMPASS_H_RAW is preferably direct (not materialized) is to save space during the initial loading of COMPASS_H. The initial load of a derived table using an indirect raw table preferably requires the raw table to temporarily materialize all the data within the window of the derived table. This would require 410 Gigabytes of space. Instead, the definition of COMPASS_H includes appropriate SOURCE_UPPER_BOUNDS and SOURCE_LOWER_BOUNDS to account for out-of-order data. In particular, an individual partition of COMPASS_H is computed from the corresponding partition of COMPASS_H_RAW plus the next partition, which stores the next hour of data. This way, any late records (by up to 50 minutes) are inserted into the appropriate partition of COMPASS_H.

Users typically query the COMPASS data using range predicates on the timestamp attribute. However, some users may want to retrieve data on a particular day, as defined by a date stamp field of COMPASS_H, rather than the timestamp field used for partitioning. These two fields are at most one hour apart (it is common for network data to contain several different timestamps assigned by network entities such as routers, DSMSs, and intermediate servers). To ensure good performance of queries on the date stamp and the timestamp, preferably LOWER_BOUNDS and UPPER_BOUNDS parameters relating the two fields are added. This way, a query on the Dates-tamp is rewritten to reference the partitioning attribute of COMPASS_H. To test the effectiveness of these constraints, a simple aggregation query can be run which counts the number of records per router for a particular date stamp day. When the query uses the date stamp constraints, the evaluation time is preferably 125 seconds, and when the query does not use the constraints, the evaluation time rises to approximately 7401 seconds.

In addition to leveraging the functionality of an underlying database management system, the data storage system of the present invention preferably generalizes the ideas of timestamp partitioning and propagating changes of source tables to individual partitions of materialized views. Lineage tracing also uses the inverted SOURCE_LOWER_BOUNDS and SOURCE_UPPER_BOUNDS to determine which partitions of the source data are used to derive a given partition of the materialized view. Coarse-grained (i.e., partition-based) lineage is sufficient to ensure efficient maintenance of derived tables, in contrast to tuple-based lineage tracing used in data exploration (see, Y. Cui and J. Widom, "Practical Lineage Tracing In Data Warehouses", In *Proc. ICDE Conf.*, pp. 367-378, 2000), probabilistic data management (see, J. Widom, "Trio: A System For Integrating Management Of Data, Accuracy, And Leineage", In *Proc. CIDR Conf.*, pp. 262-276, 2005), and multi-query optimization (see, S. Krishnamurthy, C. Wu, and M. Franklin, "On-The-Fly Sharing For Streamed Aggregation", In *Proc. SIGMOD Conf.*, pp. 623-634, 2006; and S. Madden, M. Shah, J. Hellerstein, and V. Raman, "Continuously Adaptive Continuous Queries Over Streams", In *Proc SIGMOD Conf.*, pp. 49-60, 2002).

Previous work on data warehousing and materialized view maintenance can be used to enhance or alter the data storage system of the present invention and its underlying storage engine. Examples include efficient refresh of a set of related derived tables using multi-query optimization techniques, processing queries with sliding window predicates, efficient maintenance of derived tables with aggregation, and answering queries using existing derived tables.

The multi-versioning concurrency control mechanism used in the data storage system of the present invention is in line with contemporary data warehouses. The idea is to maintain multiple logical versions of the warehouse so that long-running batch-update transactions do not interfere with queries (and vice versa). However, rather than employing per-tuple versioning, the data storage system of the present invention preferably relies on partition-level versioning due to its partition-based view update mechanism.

Data Stream Management Systems (DSMSs) assume that all the data required by queries fit in main memory. Results are produced as streams or materialized views reflecting the most recent answer. Some features of the data storage system of the present invention resemble those found in some DSMSs, though their purpose and context of usage may be different. For example, some DSMSs employ "hard" sliding windows in the sense that old data are continually purged from the system over time. In the data storage system of the present invention, sliding windows defined over derived tables may be thought as "soft" in the sense that derived tables are indexed views over the input data files, which are generally not deleted automatically, but may be deleted by a network administrator. Thus, the sliding window defines the frequently-accessed region of the data that is indexed for fast retrieval, but old data can still be accessed via the data feed files. Another difference is that derived tables reside in secondary storage and may have a much larger window length than a memory-resident sliding window maintained by a DSMS.

In a DSMS, a window typically slides forward with a fixed frequency. However, this is not the case in the data storage system of the present invention, where a derived table may be configured to be updated periodically or on-demand. The ability to update the sliding window (derived table) on-demand is significant in a data stream warehouse, where queries are issued asynchronously. This way, queries have access to fresh data and derived tables are not updated needlessly when not probed by queries.

A raw table definition preferably accounts for delayed and "future" data via NUM_PARTITIONS, NOW_FCN and VISIBLE_TIME. The idea is to accept some late records and ignore possibly erroneous data with timestamps too far into the future. The STREAM DSMS employs a similar idea, called k-constraint, which imposes a bound on out-of-order arrival of stream items with respect to their timestamps. However, the purpose of k-constraints is to reduce the memory requirements of continuous queries. For instance, a join of two streams on the timestamp attribute requires constant memory if the DSMS knows how late an item may arrive. A corresponding parameter in the DSMS can be called slack; this DSMS can employ timeouts that specify how late an item may arrive without being discarded. Timeouts are used in such a DSMS to ensure that answers of continuous queries are produced regularly rather than waiting for items that may have been lost.

The DSMS notion of a continuous query is preferably analogous to the data storage system of the present invention derived table consisting of a single partition. As shown in FIG. 6c, derived table D stores the most recent five results (one per day) of a sliding window aggregate, each over a window of 4 days. In this case, D may be thought of as a sliding window on the output of the query that defines it; the size of this window is 5 days. This window is independent of the four-day window on the source data feed.

The data storage system of the present invention preferably also acts as a data stream warehouse configuration tool. Coupled with an underlying database system, the data storage system of the present invention automates the insertion of new data and propagation of changes across materialized views. Efficient view maintenance is accomplished by exploiting user-defined partition dependencies between views and their sources. These partition dependencies are generalizations of the traditional concepts of temporal partitioning and dimension hierarchies.

The functionality of the data storage system of the present invention is preferably adaptable. For example, preferably it provides sufficient flexibility to accommodate new applications and usage scenarios. In order to make the data storage system of the present invention easier to use, preferably the specification of various parameters in the table definitions are at least partially automated, e.g., partition dependencies, sliding window lengths, and bounds on out-of order timestamp values. Also, preferably the query language used is expanded to specify derived tables by including operators from sequence languages. This preferably makes it easier for users to define views such as the CPU_MD table, which counts the lengths of gaps between successive reports generated by routers. Additionally, integrated analysis of recent and historical data is preferably enabled; even if they are stored in separate tables (see the COMPASS_RT and COMPASS_H tables discussed above). Preferably, the table storing recent data is small and unindexed in order to speed up updates, whereas the historical table may be aggregated at a more coarse-grained level. The challenge is to allow users to issue a single query and then possibly translate it into sub-queries referencing the appropriate tables, partitions, and indices. In some cases, the time intervals spanned by the recent and historical tables may overlap, leading to optimization difficulties in determining the best access plan to answer a query over both tables.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of updating a data storage system comprising:
    updating a raw database using an input data stream based on an input temporal value associated with the input data stream, wherein the input temporal value is used to update a raw temporal value associated with the raw database; and
    updating a derived temporal value associated with a derived database using the updated raw temporal value, wherein the derived temporal value and the updated raw temporal value are correlated using a user-defined relationship that includes a range defined by an upper and lower bound of partitioned data in the derived database.

2. A method according to claim 1, wherein the user-defined relationship range is a temporal range predicate of the partitioned data.

3. A method according to claim 1, wherein the user-defined relationship defines an association between a plurality of temporal values and the updated raw temporal value.

4. A method according to claim 1, wherein the user-defined relationship defines a number of partitions included in the partitioned data.

5. A method according to claim 1, wherein the derived temporal value is updated using an intermediate database appended from the updated raw database.

6. A method according to claim 1, wherein the derived database is partitioned into portions and at least one portion is dropped from consideration as part of updating the derived temporal value.

7. A computer-readable medium comprising instructions, wherein execution of the instructions by at least one computing device updates a data storage system by:
  updating a raw database associated with the data storage system using an input data stream based on an input temporal value associated with the input data stream, wherein the input temporal value is used to update a raw temporal value associated with the raw database; and
  updating a derived temporal value associated with a derived database using the updated raw temporal value, wherein the derived temporal value and the updated raw temporal value are correlated using a user-defined relationship that includes a range defined by an upper and lower bound of partitioned data in the derived database.

8. A computer-readable medium comprising instructions defined by 7, wherein the user-defined relationship range is a temporal range predicate of the partitioned data.

9. A computer-readable medium comprising instructions defined by 7, wherein the user-defined relationship defines an association between a plurality of temporal values and the updated raw temporal value.

10. A computer-readable medium comprising instructions defined by 7, wherein the user-defined relationship defines a number of partitions included in the partitioned data.

11. A computer-readable medium comprising instructions defined by 7, wherein the derived temporal value is updated using an intermediate database appended from the updated raw database.

12. A computer-readable medium comprising instructions defined by 7, wherein the derived database is partitioned into portions and at least one portion is dropped from consideration as part of updating the derived temporal value.

13. A data storage system comprising:
  a raw database;
  a derived database; and
  a computing device operatively coupled to the raw database and the derived database, the computing device updating the raw database using an input data stream based on an input temporal value associated with the input data stream, wherein the input temporal value is used to update a raw temporal value associated with the raw database, updating a derived temporal value using the updated raw temporal value, wherein the derived temporal value and the updated raw temporal value are correlated using a user-defined relationship that includes a range defined by an upper and lower bound of partitioned data in the derived database.

14. The system as defined by claim 13, wherein the user-defined relationship range is a temporal range predicate of the partitioned data.

15. The system as defined by claim 13, wherein the user-defined relationship defines an association between a plurality of temporal values and the updated raw temporal value.

16. The system as defined by claim 13, wherein the user-defined relationship defines a number of partitions included in the partitioned data.

17. The system as defined by claim 13, wherein the derived temporal value is updated using an intermediate database appended from the updated raw database.

18. The system as defined by claim 13, wherein the derived database is partitioned into portions and at least one portion is dropped from consideration as part of updating the derived temporal value.

* * * * *